Figure 1:
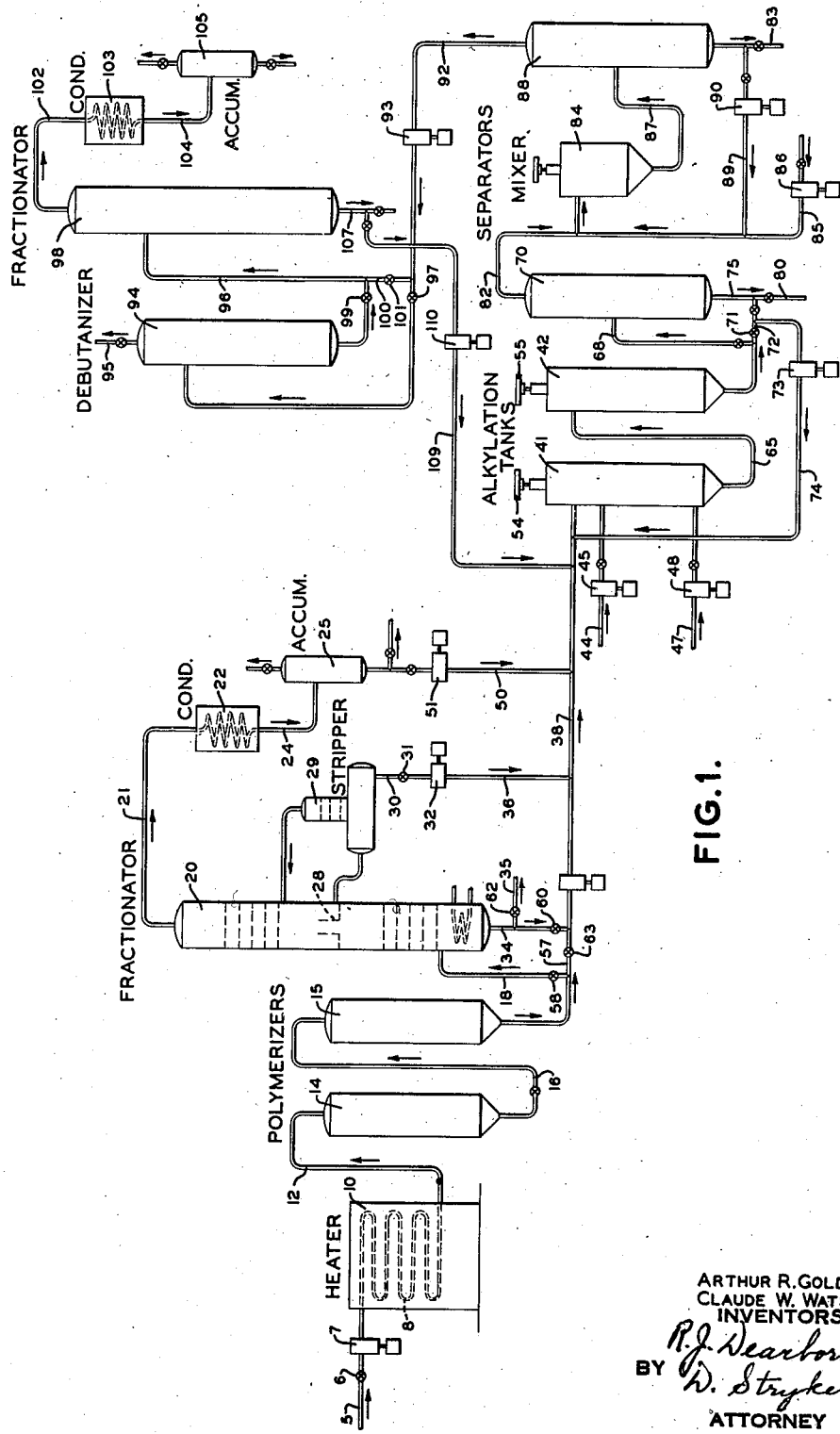

ARTHUR R. GOLDSBY
CLAUDE W. WATSON
INVENTORS

ARTHUR R. GOLDSBY
CLAUDE W. WATSON
INVENTORS

Patented Aug. 13, 1940

2,211,747

UNITED STATES PATENT OFFICE 2,211,747

COMBINATION POLYMERIZATION AND ALKYLATION OF HYDROCARBONS

Arthur R. Goldsby, Beacon, and Claude W. Watson, Dobbs Ferry, N. Y., assignors to The Texas Company, New York, N. Y., a corporation of Delaware Application April 21, 1938, Serial No. 203,238

15 Claims. (Cl. 196—10)

This invention relates to the manufacture of high antiknock hydrocarbons, particularly branched chain hydrocarbons, such as iso-octanes, which may be useful in the manufacture of motor fuels. The invention has to do with the polymerization of olefin hydrocarbons, for example normally gaseous olefins, to higher boiling point olefins which are normally liquid and the alkylation of isoparaffins with these polymers or the residual unpolymerized olefins to produce high antiknock motor fuel hydrocarbons. More particularly, the invention is concerned with the selective polymerization of isomeric butenes in a cracked $C_4$ fraction of hydrocarbon gases to produce di-isobutylenes and the alkylation of isobutane with the olefins in the residual $C_4$ fraction. Moreover, the invention comprises important improvements in a method of alkylation, wherein a portion of the materials withdrawn from the reaction zone, preferably in the form of an emulsion of the acid and hydrocarbons, is recycled to the reaction zone to improve the dispersion of the reactants and to increase the ratio of isoparaffins to olefins in the reaction mixture.

Heretofore, in the manufacture of iso-octanes from olefinic gases containing isobutylene or isomeric butenes, it has been customary to selectively polymerize the isomeric butenes to di-isobutylenes in the presence of a polymerization catalyst, and then hydrogenate the di-isobutylenes by low pressure hydrogenation using a catalyst, such as nickel; or by high pressure hydrogenation using a catalyst immune to sulfur poisoning, such as sulfides of heavy metals, particularly sulfides of the metals of the sixth group of the periodic system, for example molybdenum, tungsten, nickel or cobalt. In the foregoing methods the hydrogenation operation is expensive and difficult to control on account of the catalyst, and requires a source of hydrogen which is often expensive. Moreover, with some feed stocks and under some polymerizing conditions, there may occur a substantial depreciation in the antiknock value of the hydrocarbons as a result of the hydrogenation treatment. Further, the motor fuel produced by this method generally requires blending with a light material, such as isopentane, to adjust the volatility range for aviation gasoline.

In accordance with the present invention, instead of hydrogenating the di-isobutylenes, we react the di-isobutylenes with an isoparaffin, such as isobutane, in the presence of an alkylation catalyst, whereby iso-octanes are formed directly, without any hydrogenation treatment. The reactions may be represented by the following equations which indicate merely the principal products formed:

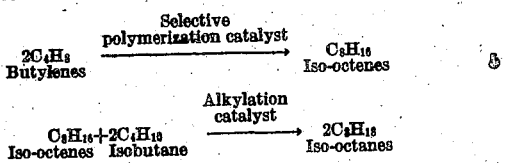

This general reaction is disclosed in copending application of Korpi-Goldsby, Serial No. 150,316, filed June 25, 1937, of which the present invention is an improvement. The alkylation step is of the general type disclosed in copending application Serial No. 148,978, Korpi-Goldsby, filed June 18, 1937. This method possesses further advantages over the hydrogenation method referred to above, in that it is capable of producing from a $C_4$ cracked hydrocarbon fraction a motor fuel having the required volatility for aviation gasoline without blending; also it is capable of handling mixtures of gaseous hydrocarbons including $C_3$ and $C_4$ hydrocarbons, while still producing a high octane motor fuel, whereas a charge stock for polymerization containing substantial amounts of propylene is unsuitable for the hydrogenation process due to depreciation in antiknock value of the motor fuel produced.

The selective polymerization operation may comprise essentially the polymerization of isobutylene to 2-2-4 trimethyl pentene, or the polymerization of isomeric butenes, including cross polymerization between the isobutylene and butene-1 or butene-2, to form mixed or interpolymers. On account of the advantage from the yield standpoint, it is preferable to operate so as to form as high a yield as possible of the mixed polymer. The formation of the mixed or interpolymer may be promoted by maintaining a high ratio of normal butylenes to isobutylene which may be done by recycling the unreacted normal butylenes in the polymerization operation.

The selective polymerization operation may be carried out in the presence of suitable catalysts, the most common of which are phosphoric acid and dilute sulfuric acid. Both of these catalysts, under proper conditions, will produce selectively di-isobutylenes and substantial cross polymerization between the iso and normal butenes, often approaching the theoretical. The phosphoric acid catalyst is preferably used in the form of a solid catalyst comprising a mixture of phosphoric acid and kieselguhr, although liquid phosphoric acid can be used. The sulfuric acid catalyst preferable is sulfuric acid of about 60 to 70% strength. At low temperatures this strength of acid will selectively absorb the isobutylene which may then be polymerized by heating the mixture to temperatures of about 200° F. When operating at high temperatures, around 160 to 180° F. using a high ratio of normal butylenes to isobutylene, a cross-polymerization between the isobutylene and normal butylenes may be effected to produce directly iso-octenes.

The hydrocarbons suitable for treatment may be any product containing isobutylene or isomeric butenes, which may be selectively polymerized. A hydrocarbon fraction containing a mixture of isomeric butenes, for example a cracked gaseous fraction such as still gases containing isobutylene, butene-1 and butene-2, may be used. It is satisfactory to use a product comprising essentially a C₄ fraction which may contain, in addition to the isomeric butenes, normal butane and iso-butane; although as pointed out above a friction containing a substantial amount of propylene together with other C₃ and C₄ hydrocarbons can be employed.

In accordance with the invention, the charging stock is subjected to a polymerization operation in the presence of a catalyst whereby di-isobutylenes are selectively produced, preferably as a result of a linking together of the iso and normal butylenes. The resulting mixture may be subjected directly to alkylation in the presence of strong sulfuric acid whereby alkylation of isobutane takes place to produce branch chain hydrocarbons, including iso-octanes. In case the isobutane content of the mixture is not sufficiently high, extraneous isobutane may be added. In some cases it may be desirable to separate the di-isobutylenes from the unreacted gases and subject the di-isobutylenes separately to alkylation in the presence of isobutane. The residual gases, from the polymerization reaction, comprising unreacted butenes and isobutane and normal butane, will usually contain an excess of isobutane and may be subjected to an alkylation operation, with or without further adjustment of the ratio of isobutane to olefins. These residual gases may be further treated to concentrate the isobutane which may be used in the alkylation operation. Moreover, the normally liquid hydrocarbons may be separated from the polymerization products and fractionated to separate any polymers higher boiling than di-isobutylene prior to subjecting the di-isobutylene to alkylation. If desired, these higher boiling polymers may be separately subjected to alkylation in the presence of extraneous isobutane or that contained in the unreacted gases or both, whereby a splitting of these high boiling olefins and alkylation with the isobutane takes place to form low boiling products suitable for motor fuel.

Figure 2:
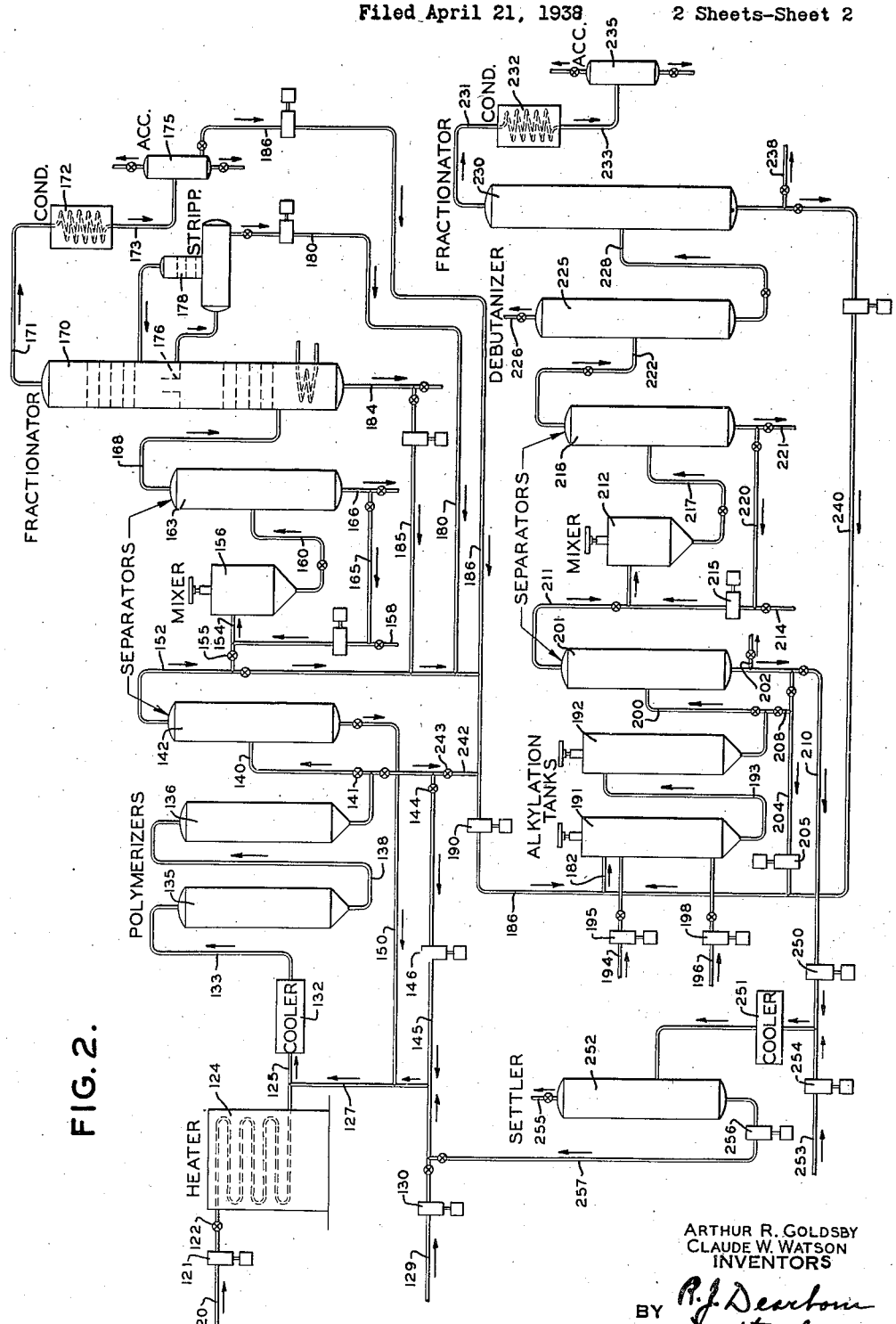

The invention will be more fully understood from the following description read in connection with the accompanying drawings. Figure 1 shows diagrammatically an apparatus for carrying out the process of the invention when the polymerization catalyst is phosphoric acid. Figure 2 shows diagrammatically an apparatus suitable for use when operating with sulfuric acid as the polymerization catalyst.

Referring to Figure 1, a hydrocarbon charging stock, preferably an unsaturated, or cracked, C₄ fraction, which may have been purified by removal of sulphur and nitrogen compounds, is introduced through the line 5 in which is located a valve 6 and pump 7, into a preheating coil 8 located in a heater 10, which may be supplied with a suitable heating medium. In the preheater the hydrocarbons are heated to a temperature of about 300° to 330° F. and preferably about 320° F. under a pressure of about 500 to 600 pounds per square inch, and preferably about 550 pounds. The hot products from coil 8 are transferred through the line 12 to the polymerization chambers 14 and 15. The polymerization chambers are charged with a solid phosphoric acid catalyst, referred to heretofore. The polymerization chambers are connected in series by a line 16 although they may be connected in parallel whereby a single chamber may be used or both chambers used simultaneously or successively. While two chambers are shown, it is to be understood that any number may be used. Sometimes it may be advantageous to use one chamber only while the other is being cleaned out or the catalyst revivified. The reaction products are withdrawn from the bottom of chamber 15 through the line 18 and any portion of the products may be recycled to either or both of the chambers by suitable lines (not shown).

The products from the polymerization chambers are passed through the line 18 to a fractionator 20 wherein the butanes and butenes may be removed overhead through the vapor line 21 to a condenser coil 22 wherein the vapors are condensed and the liquids conducted through a rundown line 24 to the receiver 25. The di-isobutylenes are collected on a chimney tray 26 and are passed to a stripping column 29 from which they are withdrawn through the line 30 in which is located a valve 31 and pump 32. The bottoms from the fractionator 20, comprising the polymers higher boiling than the di-isobutylenes, are withdrawn from the lower portion of the fractionator through the line 34 and may be discharged from the system through valve controlled line 35. The di-isobutylenes from the stripper 29 may be passed through the lines 30, 36 and 38 containing a suitable cooler (not shown) to the alkylation tank 41, wherein they are contacted with sulfuric acid introduced through the valve controlled line 44 by the pump 45. This sulfuric acid may be of a suitable alkylation strength, preferably between about 92 and 98%, for example 94%. Isobutane may also be introduced into the system through the valve controlled line 47 by pump 48. The isobutane may be substantially pure isobutane or a hydrocarbon fraction, for example a C₄ fraction, rich in isobutane. If desired, the product collecting in the receiver 25, which usually contains a suitable amount of isobutane, with or without additional frictionation to remove a part or all of the n-butane, may be passed through the line 50 by pump 51 through a suitable cooler (not shown) to the alkylation tanks as a source of isobutane. Any additional isobutane required being introduced through line 47.

It is preferable to have a ratio of isobutane to olefins in the feed subjected to alkylation of at least about 1:1 and preferably between about 3:1 and 5:1, although ratios as high as 20:1 have been used. The proportion of acid is ordinarily about 1 part by weight or more to 1 part of olefin charged. The temperature in the alkylation tanks is preferably maintained at around normal atmospheric temperature, for example 75 to 120° F. The time of reaction in the alkylation tanks may vary from about 20 minutes to several hours and preferably is about one hour. The alkylation tanks are connected in series by the line 65, and the hydrocarbons, in passing therethrough, are intimately contacted with the acid catalyst by stirrers 54 and 55 or any well known or preferred type of mixing means.

While the polymers may be fractionated and the di-isobutylenes used, for example the product from stripper 29, it may be advantageous to alkylate the polymerization product as such, without debutanization or fractionation. For such purpose the reaction products from the polymerization chambers 14 and 15 may be passed through the lines 57 and 38 directly to the alkylation operation, the valve 58 in the line 18 and valve 60 in the line 34 being closed. When using this mixture the isobutane present may be sufficient for the alkylation operation. However, if desired, additional isobutane may be added through the line 47.

Provision is made for separately alkylating the bottoms from fractionator 20. This product may be withdrawn from the lower portion of the fractionator through the line 34, valve 62 in the line 35 and valve 63 in the line 57 being closed, and passed to tankage and then through a cooler and through line 38 to the alkylation chambers. It is to be understood that suitable tankage (not shown) is provided for receiving and storing the various fractions from fractionator 20, so that they may be selectively and separately passed to the alkylation unit. These bottoms may be alkylated in the presence of extraneous isobutane, added through the line 47 or isobutane from the tank 25 added through the line 50, or both. It has been found that the isobutane will split and alkylate these bottoms to form lower boiling point products, such as motor fuel, which are primarily saturated in character.

Moreover, it is intended that the exit gases from the polymerization operation, particularly the product collected in accumulator 26, with or without further fractionation, may be separately subjected to alkylation, for example by passing them through the line 50 to the alkylation tanks. These gases usually contain a relatively high ratio of isobutane to olefins due to the partial removal of the olefins in the polymerization operation. Where the original charging stock was a $C_4$ fraction, the ratio of isobutane to butenes may range from about 1.5:1 to 3:1 and is a good charging stock for alkylation.

The operation in the alkylation tanks 41 and 42 is preferably in the liquid phase and is ordinarily carried out under pressures not greatly in excess of that necessary to maintain the liquid phase, such as 25 to 150 pounds, although it may be advantageous in some cases to maintain a higher pressure, such as for example substantially that maintained in the polymerization operation. The alkylation tanks are connected in series by the line 65 and while two tanks are shown, any number may be used and of sufficient size to give the desired time of reaction. The reaction products are transferred from the last tank 42 through the line 68 to a separator 70. By suitable regulation of the valve 71 in the by-pass line 72, a portion or all of this mixture may be recycled by the pump 73 through the line 74 back to the first reaction tank 41 to pass again through the system. This recycling of the acid-hydrocarbon mixture or emulsion is often desirable and by using a high recycle ratio, the isobutane to olefin concentration of the reaction mixture in the alkylation tanks can be kept relatively high, whereby favorable conditions for the production of a high yield of high anti-knock products boiling within the gasoline range are produced. For example, a recycle ratio of 3 to 10 times, and preferably about 4 or 5 times the original hydrocarbon charge may be advantageous. The mixture in the settler 70 is allowed to stratify and the acid collecting in the lower portion thereof may be withdrawn through the line 75 which communicates with the line 74 whereby the acid is recirculated to the system. Any portion of the spent acid may be withdrawn from the system for fortification, revivification, or other disposal, through the line 80.

The hydrocarbons in the separator 70 are withdrawn through the line 82 and conducted to a mixer 84 wherein they are intimately contacted with a neutralizing reagent comprising an alkaline material, such as a solution of caustic soda, ammonia or lime, introduced through the line 85 in which is located a pump 86. In the mixer the neutralizing solution and hydrocarbons are intimately mixed to neutralize acids in the hydrocarbons. The mixture is then transferred through the valve controlled line 87 to a separator 88 wherein the neutralizer and hydrocarbon are allowed to stratify and the neutralizer separating in the lower portion thereof recirculated to the mixer through the valve controlled line 89 by pump 90 or any portion or all withdrawn through valved line 83. The neutralized hydrocarbons are passed from the separator 88 through the line 92 by pump 93 to a debutanizer or stabilizer 94 in which materials lighter than the desired gasoline, such as normally gaseous hydrocarbons lighter than n-butane, and all or a portion of the n-butane, are released from the top of the debutanizer through the valve controlled line 95. This gaseous fraction, either without or with fractionation to concentrate the isobutane, may be recycled to the alkylation unit by suitable lines (not shown). Bottoms are withdrawn from the lower portion of the debutanizer 94 through the line 96 and passed to a fractionator 98. It is usually desirable to debutanize the alkylated product especially when a substantial amount of lower boiling normally gaseous hydrocarbons is present. In some cases it may be unnecessary to debutanize the product, for example when only a $C_4$ hydrocarbon fraction is treated and the excess $C_4$ hydrocarbons may be retained in the finished product to give the desired volatility. Also in case there is a previous debutanization, such as in the tower 20, it may be unnecessary to debutanize again in the debutanizer 94. The debutanizer 94, accordingly, may be by-passed by closing valve 97 in the line 92 and valve 99 in line 96 and conducting the products through the by-pass line 100 by opening valve 101.

In the fractionator 98 it is intended to separate the products of desired boiling range, for example those suitable for gasoline manufacture, and pass them overhead through the vapor line 102. The vapors are condensed in the condenser 103 and the condensate passed through the run-down line 104 to an accumulator 105. The bottoms separated as a liquid in the fractionator 98 may be withdrawn from the system through the line 107. All or a portion of these products may be passed through the line 109 and pump 110 to the alkylation system. This heavy product recycled to the alkylation system may be alkylated in combination with any of the materials described heretofore and introduced from the lines 34, 38, 50 and 57. It has been found that a portion of such heavy material may be split and alkylated, thereby giving an increased yield of desired boiling range hydrocarbons.

Referring to Figure 2, the hydrocarbon charge is introduced through the line 120 in which is located a pump 121. This charge ordinarily comprises essentially a C₄ cracked hydrocarbon fraction, such as a fraction from commercial cracking still gases. If the sulfur content of this gas is substantial, it may be desirable to desulfurize the charge with aqueous caustic, such as 10° Bé. caustic soda solution. Ordinary cracking still gases can be handled without desulfurization, because this process avoids hydrogenation in which even small amounts of sulfur poison the hydrogenation catalyst. The charge is pumped through line 120 and valve 122 to a preheater 124. The preheated product is passed through the line 125 wherein the hydrocarbons come in contact with recycle acid from line 127 and new acid or make-up acid introduced through the line 129 in which is located a pump 130. The acid may be about 60 to 70% strength and preferably about 69% concentration. The temperature of the mixture is adjusted by heater 124 and cooler 132 in line 125 and may be around 160 to 180° F. The hydrocarbons are preferably maintained in the liquid phase and sufficient pressure is maintained for this purpose. Ordinarily about 100 to 200 pounds is sufficient and preferably about 150 pounds.

The polymerization reaction is exothermic and on contacting the hydrocarbons with the acid there may be a temperature rise, for example 6 to 8° F., and in order to maintain the temperature at the desired point, the products are passed through a cooler or heat exchanger 132 wherein the temperature is adjusted to the desired point, preferably about 170° F. The mixture is then passed through the line 133 to polymerization vessels 135 and 136 which are connected in series by a connecting line 138. While two polymerization tanks are provided, it is to be understood that any number may be used and of suitable size to provide the necessary time for reaction. The time of reaction may vary from about 5 to 30 minutes and preferably about 20 minutes. The polymerization tanks are provided with baffles, orifices or other suitable means for providing intimate contact between the acid and the hydrocarbons. In the polymerization vessels it is intended that a selective polymerization take place to produce di-isobutylenes or iso-octenes, preferably containing a large proportion of mixed or inter-polymers resulting from the polymerization of one molecule of isobutylene with one molecule of normal butene.

The reaction products are passed from the last reaction vessel 136 through the line 140 controlled by valve 141 to a settler 142. By suitable regulation of the valve 144 in the line 145, all or a portion of the reaction mixture may be recycled by pump 146 in the system. It is preferable to maintain sufficient recycle whereby the reaction mixture comprises about 1 volume of fresh charge, 4 volumes of recycled hydrocarbon and 5 volumes of recycled acid. It is preferable to maintain a high proportion of recycled hydrocarbon in order to maintain a high ratio of butenes to isobutylene which is favorable for a large yield of the mixed polymer. The volume of recycled acid is maintained by allowing the materials in the settler 142 to stratify, whereby the acid may be withdrawn from the lower portion thereof and returned through the line 150 to the line 127. The hydrocarbon reaction product is withdrawn from the upper portion of the settler 142 through the line 152. The polymerization products may be treated in several different ways.

According to one method of operation, the hydrocarbons, withdrawn from the separator 142 through the line 152, are passed through line 154 controlled by valve 155 to a mixer 156. In the mixer 156 the acid oil is contacted with a neutralizing agent, such as caustic soda solution, introduced through the line 158. The products from the mixer 156 pass through the line 160 to a separator 163 wherein the neutralizer is separated and recycled through the line 165. Any portion of this spent caustic may be withdrawn from the system through the valve controlled line 166. In some cases it may be desirable to pass the mixture of hydrocarbons and neutralizer through hydrolysis tanks, under a pressure of about 250 pounds and at temperatures of about 300° F. to effect hydrolysis of any stable acid compounds.

The hydrocarbon mixture separating in the separator 163 is passed through line 168 in which may be located a heat exchanger or preheater (not shown) to a fractionator 170 wherein the butanes are distilled overhead through the vapor line 171 and conducted through condenser 172 and run-down line 173 to an accumulator 175. The di-isobutylenes are collected on a chimney tray 176 from which they flow to a stripper 178. They are then withdrawn through the line 180 communicating with lines 152, 186 and 182 containing a suitable cooler (not shown) leading to an alkylation unit referred to hereinafter. Bottoms from the fractionator 170 are withdrawn through the line 184. All or a portion of these bottoms may be sent to the alkylation unit through the lines 185, 152, 186 and 182, suitable tankage (not shown) being provided. The product in the accumulator 175 usually contains a large proportion of isobutane and this, with or without further fractionation, may be passed through line 186 and line 182 to the alkylation system. This latter product may contain a suitable ratio of isobutane to olefins whereby it may be desirable to alkylate it separately. Any one of the products from lines 185, 180 or 186, or any mixture thereof, may be alkylated substantially the same as the corresponding mixtures described in connection with Figure 1. If it is desired to alkylate the di-isobutylenes, the product from stripper 178 is passed through line 180 and then forced by pump 190 through lines 186 and 182 to alkylation tank 191 connected in series by line 193 with tank 192. These alkylation tanks are similar in construction to those referred to heretofore, in connection with Figure 1, and provide means for intimately contacting hydrocarbons with an acid introduced through the valve controlled line 194 by pump 195. The acid is preferably sulfuric acid of about 94% concentration. In the alkylation tanks, it is intended that alkylation of isobutane with the olefins take place to form iso-octanes, as previously explained. In case there is insufficient isobutane to bring the ratio of isobutane to olefins up to the proper point, extraneous isobutane may be introduced into the system through the line 196 by pump 198. The reaction products are passed from the last alkylation tank 192 through the line 200 to a separator 201 wherein the acid separates and is withdrawn through the line 202, which communicates with the recycle line 204 containing a pump 205. All or a portion of the reaction products from the alkylation chambers may be recirculated by the valve controlled by-pass line 208. The spent acid may be withdrawn as desired through the valve controlled line 210.

The hydrocarbons separating in the separator 201 are conducted through the line 211, to a mixer 212 wherein they are contacted with a neutralizing agent, such as caustic soda solution, introduced through the line 214 by the pump 215. The mixture passes from the mixer 212 through valve controlled line 217 to a separator 218 wherein the alkaline reagent is separated and withdrawn through the line 220 for recirculation or discharged from the system through the valve controlled line 221. The neutralized hydrocarbons are passed from the separator 218 through the line 222 to a debutanizer 225 from which excess butane or other undesirable low boiling products are removed overhead through the line 226, and these with or without fractionation may be recycled to the alkylation unit through suitable lines (not shown). The debutanized product is withdrawn from the lower portion of the debutanizer through the valve controlled line 228 and passed to a fractionator 230 wherein the motor fuel or gasoline fraction is fractionally distilled and passed overhead through the vapor line 231, condenser 232 and run-down line 233 to an accumulator 235. The bottoms from the fractionator 230 may be withdrawn from the system through the line 238 or may be recirculated all or in part through the valve controlled line 240 to the alkylation operation, wherein it may be resubjected to alkylation, separately or in conjunction with other materials, referred to heretofore. This heavy product may be split and alkylated into additional products boiling within the motor fuel boiling range.

According to another method of operation, the hydrocarbons from the separator 142 may be passed directly to the alkylation operation through the lines 152, 186 and 182. In this way the neutralization, hydrolysis and debutanizing operations may be omitted.

As another modification, it is contemplated that the mixture of hydrocarbon and acid which may contain alkyl acid sulphates, may be passed all or in part from the last reaction vessel 136 through the branch line 242 controlled by valve 243 directly to the first alkylation tank 191 through lines 186 and 182. In such case, it is desirable to fortify the acid with a stronger acid to bring the strength of the mixture from about the 69% strength up to alkylation strength, preferably about 94% strength. For this purpose strong acid, such as 98 or 100% sulfuric acid or even fuming acid of 105, 115 or 120% strength may be used. In this way the mixture of hydrocarbons and acid from the polymerization vessels 135 and 136 may be subjected directly to alkylation in the presence of isobutane, extraneously added if necessary.

According to still another method of operation, the spent acid withdrawn from the alkylation unit may be recycled in whole or part to the polymerization unit. As shown in Figure 2 the acid withdrawn from separator 201 may be passed by pump 250 through line 210 and a suitable cooler 251 to a settler 252, where stratification is allowed to take place. The acid discharged from the alkylation unit generally has a concentration of about 80 to 90% or somewhat higher, the balance being mainly organic material taken up by the acid. While this acid would require revivification or fortification for reuse in the alkylation unit, economy may be effected by suitably diluting this acid with water to reduce it to the required concentration for the polymerization reaction, and then using the diluted acid as a part of the acid charge in the polymerization reaction. As shown, water for dilution purposes is introduced into the acid through line 253 containing pump 254 in advance of the cooler 251, so that this cooler absorbs the heat of dilution. The cooled and diluted acid will then stratify in settler 252 into a lower acid layer and an upper oily sludge layer, the latter being removed from the settler by line 255. The diluted acid layer is then forced by pump 256 through line 257 to the acid feed line 129 of the polymerization unit.

It is to be understood that certain features described hereinbefore, as applied to a combination polymerization and alkylation operation, are useful in a separate alkylation process. For example, the recycling of the materials withdrawn from the alkylation tanks either before or after separation of the acid and hydrocarbons (including the acid-hydrocarbon emulsion and the separated acid, or both), and the recycling of certain heavier fractions of the product obtained in the fractionation of the alkylate to separate the desired motor fuel hydrocarbons therefrom, may be employed in any type of alkylation operation.

*Example I*

A $C_4$ fraction comprising about 16% isobutylene, 23% of normal butylenes, 18% isobutane and 43% n-butane, was subjected to polymerization in the presence of a solid phosphoric acid catalyst, consisting of a calcined mixture of phosphoric acid and kieselguhr. A pressure of about 550 pounds and temperature of about 320° F. was maintained on the reaction mixture. The resulting product comprised about 22% iso-octenes, 4% polymer bottoms and about 74% residual $C_4$'s. The residual gases comprised about 2½% isobutylene, 6½% normal butylene and 91% butanes. The product was debutanized and the debutanized product subjected to fractionation to separate the iso-octenes. The iso-octenes were then subjected to an alkylation operation in the presence of isobutane and sulfuric acid of about 94% concentration at a temperature of about 90° F. The ratio of isobutane to olefins in the feed was about 3:1. A gasolene fraction containing a large proportion of iso-octanes and having an antiknock value of about 90 was obtained. The yield was about 165% based on the iso-octenes.

*Example II*

A $C_4$ fraction comprising about 18% isobutylene, 28% of normal butylenes and about 22% iso and 32% normal butanes, was subjected to polymerization in the presence of sulfuric acid of about 69% strength, at a temperature of about 170° F., under a pressure of about 150 pounds for a period of approximately 20 minutes. A portion of the reaction products was recycled to maintain a recycle ratio of total hydrocarbons to fresh $C_4$ hydrocarbon charge of about 7:1 and a recycle ratio of total hydrocarbons to isobutylene of about 40:1. The ratio of acid to total hydrocarbons was about 1:1 by volume. The reaction products were passed to a separator in which the acid was separated and recycled to the system and the hydrocarbons were neutralized with dilute caustic soda to remove acidity. The resulting product contained about 20% of iso-octenes, about 4% heavy polymer bottoms, and approximately 76% of residual gases. The product was fractionated to separate the iso-octenes which were then subjected to an alkylation operation in the presence of isobutane and sulfuric acid of about 94% strength under a pressure of about 50 pounds and a temperature of about 90° F. for a period of about an hour. A yield of normally liquid hydrocarbons falling within the gasoline boiling point range of about 165% based on the iso-octenes was obtained, having an antiknock value of about 90.

*Example III*

The residual gases from the hot acid polymerization process of Example II contained about 12½% of normal butylenes and about 87½% butanes. The proportion of isobutane in the butanes was about 36%. The residual gases were subjected to an alkylation operation in the presence of sulfuric acid of about 94% strength under pressure of about 50 pounds and temperature of about 90° F. for a period of about one hour. A gasoline product, amounting to about 150% based on the olefins consumed and having an antiknock value of about 90 was obtained.

*Example IV*

The product from the hot sulfuric acid polymerization step of Example II, comprising acid and hydrocarbons, was subjected directly to an alkylation operation in which sufficient strong acid of about 100% was added to bring the acidity up to about 93%. Sufficient extraneous isobutane was added to bring the ratio of isobutane to olefins to about 3:1. The mixture under a pressure of about 50 pounds and a temperature of about 90° F., was allowed to react for about an hour. The total reaction products, including hydrocarbons, were recycled in sufficient amount to make the reaction mixture about 1 part of fresh feed, about 4 parts of recycle hydrocarbons and about 5 parts of acid. The reaction products were separated, the acid recycled to the system and the hydrocarbon fraction neutralized and fractionated to obtain a gasoline fraction amounting to about 150% based on the olefins consumed and having an antiknock value of about 90.

Obviously many modifications and variations of the invention, as hereinbefore set forth, may be made without departing from the spirit and scope thereof, and therefore only such limitations should be imposed as are indicated in the appended claims.

We claim:

1. A process for the alkylation of hydrocarbons, which comprises maintaining a circulating stream of reaction mixture comprising strong sulfuric acid and hydrocarbons in a closed circuit, introducing into said stream olefins and low boiling isoparaffins in such amounts that an excess of isoparaffins is maintained in the mixture, withdrawing reaction products from said stream and separating from the products withdrawn the alkylated hydrocarbons.

2. A process for the manufacture of high antiknock gasoline hydrocarbons which comprises subjecting an unsaturated C₄ hydrocarbon fraction containing iso and normal butylenes to partial polymerization in the presence of a polymerization catalyst under selective polymerization conditions whereby di-isobutylene polymers are produced, separating said polymers from the residual gases, contacting said residual gases in a reaction zone maintained under alkylating conditions with strong sulfuric acid and with isobutane in an amount in excess of the olefins, whereby the isobutane is alkylated by the olefins, withdrawing acid and hydrocarbon reaction products from said reaction zone, recycling a substantial proportion of said acid and hydrocarbon reaction products to the reaction zone to maintain therein a materially higher ratio of acid and isoparaffins to olefins than normally present in the fresh feeds of olefins, isoparaffins and acid to said zone, and separating the alkylation products from the unrecycled portion of the reaction products.

3. A process for the manufacture of normally liquid hydrocarbons of high antiknock value from an unsaturated C₄ hydrocarbon fraction containing isobutylene, normal butylenes and isobutane, which comprises treating the hydrocarbons with sulfuric acid of about 60 to 70% concentration to remove the isobutylene, subjecting the remaining hydrocarbons in the presence of an excess of isobutane to the action of sulfuric acid of about 92 to 98% concentration in a reaction zone to alkylate the isobutane with the normal butylenes, withdrawing acid and hydrocarbon reaction products from said zone, recycling one portion of said acid and hydrocarbon reaction products to the reaction zone in sufficient amount to maintain therein a substantially higher ratio of acid and isoparaffin to olefins than in the fresh feeds of acid and hydrocarbons to said zone, separating the hydrocarbons from the other portion of the reaction products, fractionating the hydrocarbons to obtain a fraction rich in isobutane and recycling said fraction to the reaction zone to increase the ratio of isobutane to olefins therein.

4. A process for the alkylation of hydrocarbons, which comprises continuously feeding olefins, an excess of low boiling isoparaffins and strong sulfuric acid to a reaction zone maintained under alkylating conditions whereby the isoparaffins are alkylated by the olefins, withdrawing acid and hydrocarbon reaction products from said zone, recycling one portion of said withdrawn acid and hydrocarbon reaction products to the reaction zone to maintain therein a substantially higher ratio of acid and isoparaffins to olefins than normally present in the fresh feeds of olefins, isoparaffins and acid to said zone, separating a liquid hydrocarbon fraction from the other portion of said withdrawn reaction products and recycling at least a portion of said fraction to the reaction zone.

5. A process for the alkylation of hydrocarbons, which comprises continuously feeding olefins, an excess of low boiling isoparaffins and strong sulfuric acid to a reaction zone maintained under alkylating conditions, whereby the isoparaffins are alkylated by the olefins, withdrawing acid and hydrocarbon reaction products from said zone, recycling one portion of said withdrawn acid and hydrocarbon reaction products to the reaction zone to maintain therein a substantially higher ratio of acid and isoparaffins to olefins than normally present in the fresh feeds of olefins, isoparaffins and acid to said zone, separating the hydrocarbons from the other portion of said withdrawn reaction products, fractionating said hydrocarbons to obtain a lighter fraction containing hydrocarbons of motor fuel boiling range and a heavier fraction containing hydrocarbons of higher boiling range than said motor fuel, and recycling at least a portion of said heavier fraction to the reaction zone.

6. A process for the alkylation of hydrocarbons, which comprises continuously feeding olefin-containing hydrocarbons, an excess of low boiling isoparaffins and strong sulfuric acid to a reaction zone maintained under alkylating conditions, withdrawing acid and hydrocarbon reaction products from the reaction zone, recycling a large proportion of the withdrawn acid and hydrocarbon reaction products to maintain in the reaction zone a materially higher ratio of acid and isoparaffins to olefins than normally present in the fresh feeds of olefins, isoparaffins and acid thereto, and separating the alkylated products from the remaining portion of the reaction products.

7. A process for the alkylation of hydrocarbons, which comprises continuously subjecting olefin-containing hydrocarbons and an excess of low boiling isoparaffins to the action of strong sulfuric acid in a reaction zone maintained under alkylating conditions, withdrawing acid and hydrocarbon reaction products from the reaction zone, recycling one portion of the withdrawn acid and hydrocarbon reaction products to said zone to maintain therein a substantially higher ratio of isoparaffins to olefins than normally present in the fresh feed of olefins and isoparaffins thereto, separating the acid and hydrocarbons from the other portion of the reaction products, recycling at least a portion of the separated acid to the reaction zone and recovering from the separated hydrocarbons the alkylated hydrocarbons.

8. A process according to claim 7, in which at least a portion of the separated acid is withdrawn from the system and fresh acid added in sufficient amount to make up for the portion withdrawn.

9. A process for the alkylation of hydrocarbons, which comprises continuously feeding olefins, an excess of low boiling isoparaffins and strong sulfuric acid to a reaction zone maintained under alkylating conditions whereby the isoparaffins are alkylated by the olefins, withdrawing acid and hydrocarbon reaction products from said zone, recycling one portion of said withdrawn acid and hydrocarbon reaction products to the reaction zone to maintain therein a substantially higher ratio of acid and isoparaffins to olefins than normally present in the fresh feeds of olefins, isoparaffins and acid to said zone, separating the hydrocarbons from the other portion of said withdrawn reaction products, fractionating said hydrocarbons to obtain a fraction rich in the excess isoparaffins and recycling said fraction to the reaction zone.

10. A process for the alkylation of hydrocarbons, which comprises circulating a stream containing low boiling isoparaffins and strong sulfuric acid through a circuit comprising an enlarged reaction zone, introducing hydrocarbons containing olefins and isoparaffins into said stream, the proportions of said olefins and isoparaffins being such that an excess of isoparaffins over olefins is continuously maintained therein, intimately contacting the olefins and isoparaffins with the acid in said reaction zone under alkylating conditions whereby the isoparaffins are alkylated by the olefins, withdrawing reaction products from said stream and recovering the alkylated hydrocarbons from said withdrawn reaction products.

11. A process according to claim 10, in which the hydrocarbons introduced into said stream are a residual $C_4$ fraction of cracked hydrocarbon gases from which di-isobutylene polymers have been recovered by selective catalytic polymerization.

12. The method according to claim 2 in which polymers produced in the polymerization stage are passed to the alkylation zone for alkylation with the isoparaffin.

13. A process for the manufacture of high antiknock gasoline hydrocarbons which comprises subjecting a normally gaseous hydrocarbon fraction containing $C_3$ and $C_4$ olefins including isoand normal butylenes to partial polymerization in the presence of a polymerization catalyst under polymerization conditions and whereby polymers are produced, separating said polymers from the residual gases, contacting said residual gases in a reaction zone maintained under alkylating conditions with strong sulfuric acid and with an isoparaffin fraction comprising isobutane in an amount in excess of the olefins, whereby the isoparaffins are alkylated by the olefins, withdrawing acid and hydrocarbon reaction products from said reaction zone, recycling a substantial proportion of said acid and hydrocarbon reaction products to the reaction zone to maintain therein a materially higher ratio of acid and isoparaffins to olefins than normally present in the fresh feeds of olefins, isoparaffins and acid to said zone, and separating the alkylation products from the unrecycled portion of the reaction products.

14. The method according to claim 13 in which polymers produced in the polymerization stage are passed to the alkylation zone for alkylation with the isoparaffins.

15. A process for the alkylation of hydrocarbons which comprises maintaining a circulating stream of reaction mixture comprising strong sulfuric acid and hydrocarbons in a closed circuit, introducing into said stream olefins and low boiling isoparaffins in such amounts that an excess of isoparaffins is maintained in the mixture, withdrawing reaction products from said stream, separating from the products withdrawn the alkylated hydrocarbons, separating said alkylated hydrocarbons into a lighter fraction containing motor fuel hydrocarbons and a heavier fraction containing higher boiling hydrocarbons and recycling at least a portion of said heavier fraction to said closed circuit.

ARTHUR R. GOLDSBY.
CLAUDE W. WATSON.